United States Patent [19]

Lessig, III

[11] 4,356,686

[45] Nov. 2, 1982

[54] CUTTING MECHANISM FOR A GRASS CUTTING MACHINE

[75] Inventor: William R. Lessig, III, Cockeysville, Md.

[73] Assignee: Black & Decker Inc., Newark, Del.

[21] Appl. No.: 259,484

[22] Filed: Apr. 30, 1981

[51] Int. Cl.³ .......................................... A01D 55/18
[52] U.S. Cl. ...................................... 56/295; 30/347; 56/12.7
[58] Field of Search ................... 56/295, 12.7; 30/276, 30/347

[56] References Cited

U.S. PATENT DOCUMENTS

| | | | |
|---|---|---|---|
| 3,664,102 | 5/1972 | Reber | 56/295 |
| 3,815,234 | 6/1974 | Nelson et al. | 56/295 |
| 3,826,068 | 7/1974 | Ballas et al. | 56/12.7 |
| 4,024,635 | 5/1977 | Mizuno et al. | 56/12.7 |
| 4,095,338 | 6/1978 | Naohiko et al. | 56/12.7 |
| 4,136,446 | 1/1979 | Tripp | 56/12.7 |
| 4,169,311 | 10/1979 | Evenson et al. | 56/12.7 |
| 4,183,138 | 1/1980 | Mitchell et al. | 56/12.7 |
| 4,249,311 | 2/1981 | Inaga | 56/12.7 |
| 4,250,623 | 2/1981 | Pittinger et al. | 56/12.7 |
| 4,271,595 | 6/1981 | Rahe | 56/12.7 |

FOREIGN PATENT DOCUMENTS 1657039  10/1970  Fed. Rep. of Germany ........ 56/295

Primary Examiner—Paul J. Hirsch
Attorney, Agent, or Firm—Harold Weinstein; Edward D. Murphy; Walter Ottesen

[57] ABSTRACT

A machine for cutting grass and the like having a flexible strip-like cutting member supported by a disc within a housing. The strip-like member is mounted vertically and the housing has a slope such that the strip-like member is rotated to have a horizontal leading cutting edge extending beyond the housing and an inclined trailing edge which creates a vortex effect within the housing when the strip is driven by a motor to cause grass to assume a more vertical position for cutting thereof. If the cutting edge of the strip strikes an obstacle, it will be deflected into a recess in the housing rather than propelling the obstacle which might have resulted if the blade were rigid. A bottom cover plate is removably secured to the housing to permit the disc carrying the cutting member to store the same therein. Indexing of the cutting member permits measured amounts thereof to be fed from storage.

4 Claims, 7 Drawing Figures

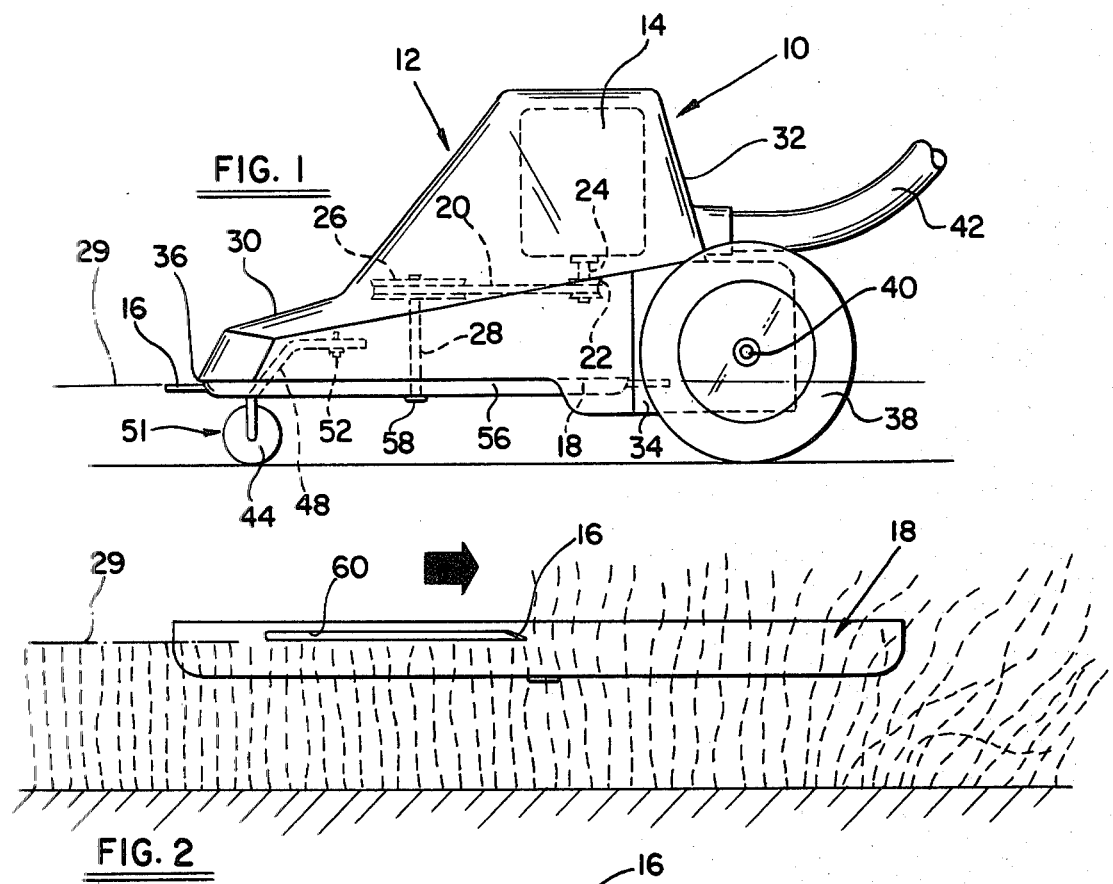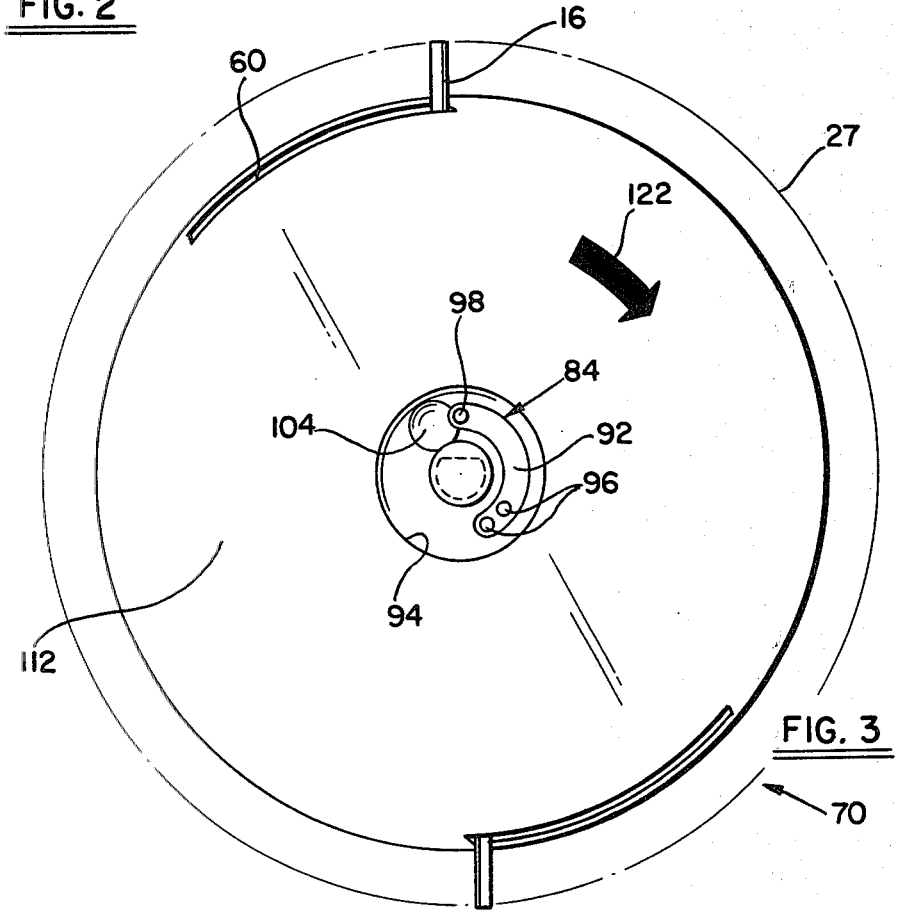

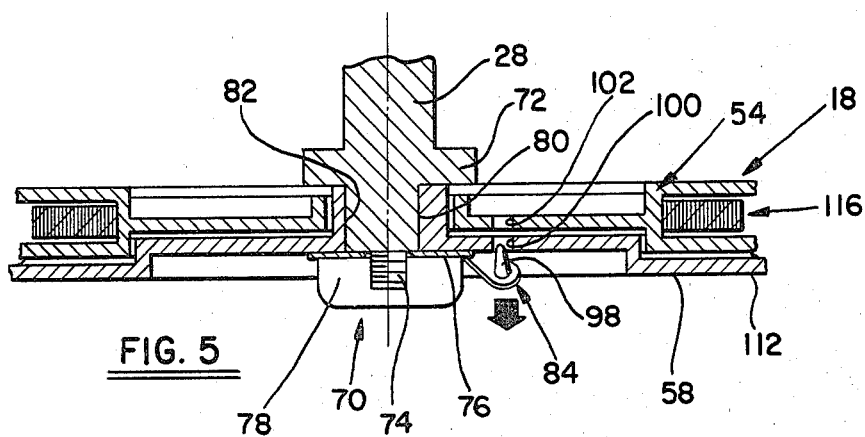
FIG. 5
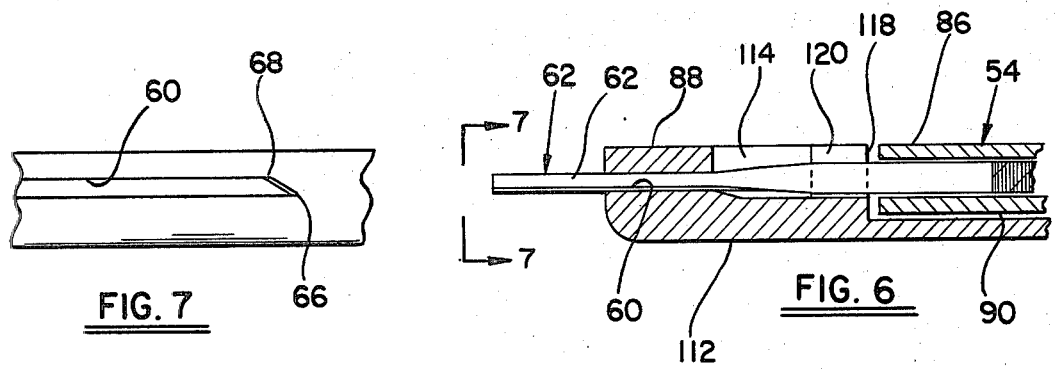
FIG. 7
FIG. 6
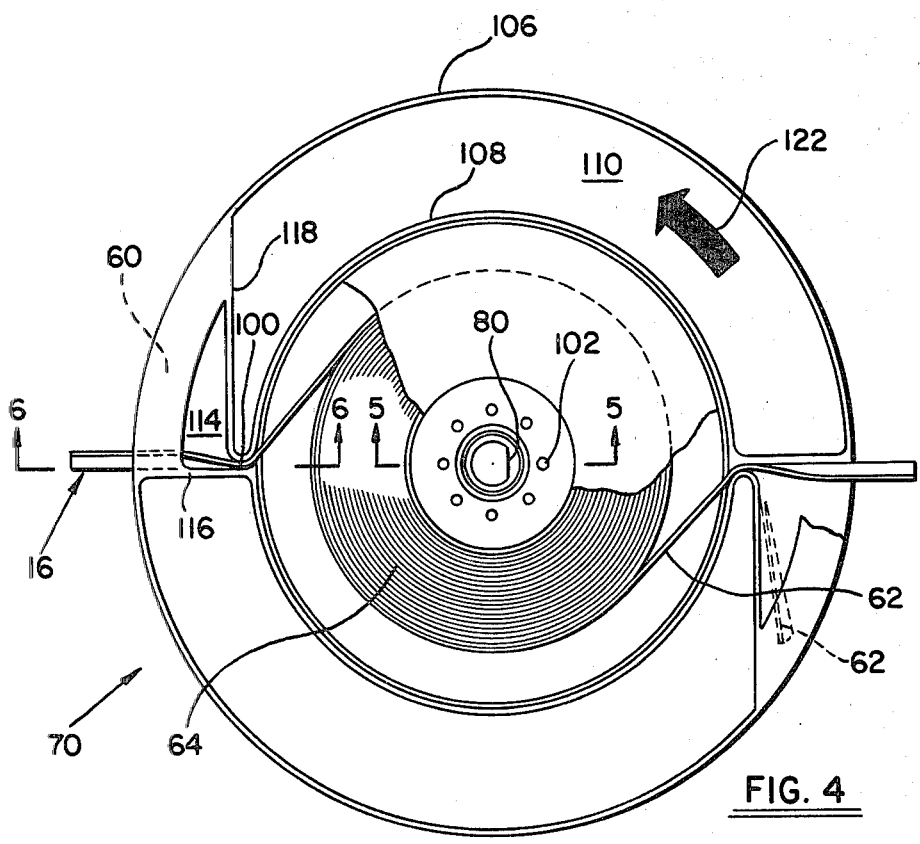
FIG. 4

CUTTING MECHANISM FOR A GRASS CUTTING MACHINE

CROSS-REFERENCE TO A RELATED APPLICATION

A more detailed explaination of the ground support system set forth herein will be found in my copending case, assigned to the same assignee, entitled "Ground Support System for a Grass Cutting Machine", U.S. Ser. No. 259,485, filed Apr. 30, 1981.

BACKGROUND OF THE INVENTION

1. Field of the Invention

The invention relates to a rotary grass-cutting machine, capable of both cutting grass and trimming lawn edges, employing a flexible strip-like cutting blade carried by a disc, which can be deflected within the disc when the blade strikes a stone or hard object without deflecting the stone, or otherwise disturbing the machine. Also the flexible strip-like blade is angled to produce a vortex effect that aids in both cutting and removal of the blades of grass.

2. Description of the Prior Art

Conventional rotary grass-cutting machines use a fixed blade which is driven by a motor, the leading edge of which provides a cutting edge. When such a blade strikes a hard object, such as a stone, the hard object is deflected and may become mobile creating the possibility of damage to the operator, the blade, or the machine.

The feature of flexibility has been attempted in the prior art at various points and in various ways. Some of the prior art patents teach flexible blades, or flexible blade mountings and/or retractable blade mountings, but for one reason or another none of the prior art attempts have been completely satisfactory. Examples of the prior art attempts can be found in U.S. Pat. Nos. 3,104,510; 3,320,733; 3,343,351; 4,065,913; British Pat. No. 1,237,307; and German Patent Publication (Auslegeschrift) 1,657,039.

SUMMARY OF THE INVENTION

The invention employs a flexible strip-like cutting member supported by a disc within a housing of a rotary-type grass cutting machine. The strip-like member is wound vertically about the disc and the housing has a slope such that the strip-like member is rotated, or twisted, as it extends from the disc beyond the housing so that it has a horizontal leading cutting edge and an inclined trailing edge. This ensures that the strip-like member, as it is driven by a motor in the housing and rotates in the horizontal plane, not only cuts the grass, but creates a vortex which aids cutting by straightening the individual blades of grass.

The disc is indexed to permit the operator to withdraw measured lengths of the cutting strip. A recess is formed in the disc adapted to receive the cutting strip, which is a flexible plastic material, upon the strip being deflected by a heavy obstacle, such as a stone, or the like.

When the cutting blade becomes frayed, the operator withdraws a new piece of the strip from the disc and cuts the used portion. To replace a spent disc, a cover plate on the bottom of the machine is removed and a new disc having a wound strip thereon is mounted on the cover plate after the spent disc has been removed.

One object of the present invention is to provide an improved grass-cutting machine of the rotary type which overcomes the prior art disadvantages; which is simple, economical, and reliable; which uses a cutting blade that is flexible and can be deflected into a recess in the disc whenever the blade strikes a heavy obstacle; which blade is angled to create a vortex for aiding in the cutting and removal of the grass; which uses a flexible strip-like cutting blade having a stored portion and a cutting portion with only the cutting portion extending from the disc; which blade can be deflected if it strikes a hard object; and which cutting blade can be easily replaced when frayed or dull.

Other objects and advantages of the present invention will be apparent from the description of the following illustrative embodiment. The novel features of the invention are pointed out in the claims.

BRIEF DESCRIPTION OF THE DRAWINGS

An illustrative embodiment of the present invention will be described in connection with the accompanying drawings in which:

FIG. 1 is a side elevational view of a grass-cutting machine according to the present invention;

FIG. 2 is an elevational view of the disc, including carrying the strip-like cutting blade in relation to grass, graphically showing the effects of the vortex;

FIG. 3 is a bottom plan view of the disc;

FIG. 4 is a bottom plan view of the disc with the cover partially in section to show the hub carrying the wound storage of the strip-like cutting blade, and the deflection pocket of the cover;

FIG. 5 is an enlarged sectional view taken along lines 5—5 of FIG. 4, showing the indexing and blade storage;

FIG. 6 is a sectional view taken along lines 6—6 of FIG. 4, showing the twisting of the cutting portion of the blade;

FIG. 7 is an end view taken along the lines 7—7 of FIG. 6, showing the angle at which the blade extends from the slot of the cover.

DESCRIPTION OF THE PREFERRED EMBODIMENT

In the illustrated embodiment of the invention a grass cutting machine 10, of the rotary type, is shown in FIG. 1. The machine 10 has a housing 12 in which is mounted a suitable power source such as an electric motor 14, though an internal combustion engine could also have been used. The motor 14 drives a plastic strip-like cutting blade 16 carried on a disc 18 via a belt-drive including a belt 20 driven by a pulley 22 on shaft 24 of motor 14. Belt 20 drives a pulley 26 mounted on a shaft 28 which rotates the disc 18. The blade 16 prescribes a cutting circle 27 shown in dotted line representation in FIG. 3, which lies in a plane 29 shown in FIGS. 1 and 2.

The housing 12 has a deck 30 which extends outwardly from the bottom of a central motor portion 32 thereof in the form of a substantial rectangle having a stepped inset 34 at opposite rear corners thereof, and a arcuate edge 36 centrally disposed at the front end thereof in superposition to the disc 18. Rear wheels 38 are separately disposed to nest in the insets 34 of the deck 30 so as to provide a smooth side profile while extending slightly beyond the rear edge thereof. Each of the wheels 38 are journaled by an axle 40 affixed to the housing 12 inwardly of the inset 34 of the deck 30 and above the cutting plane 29. A handle 42 is connected to the rear of the motor portion 32 of the housing 12 above the deck 30 thereof and central to the wheels 38. The handle 42 will guide the machine 10 over the cutting surface and will be manipulated by the operator so as to cause either of the wheels 38 to act as pivot points in steering the machine 10.

A roller 44 is connected to the housing 12 and extends under the disc 18 at the front edge of the deck 30 for a length substantially corresponding to that of the arcuate edge 36. The roller 44 has a width which greatly exceeds its diameter. The roller 44 is journaled as shown in FIG. 1 by the free end of a support leg or bracket 48 which extends inwardly thereof from opposite ends. The roller 44 is mounted below the cutting plane 29 and within the cutting circle 27. The bracket 48 is substantially "L" shaped and may be in the form of a bent rod of substantially circular cross section, and which section is of small diameter so that only a very small surface area is present along its exposed length to prevent the build-up of grass clippings thereon. Each of the brackets 48 are secured to the housing 12 as shown in FIG. 1 by a bolt 52 threadedly received in a tapped hole in the housing 12. The brackets 48 will be secured to opposite front corners of the deck 30 of the housing 12.

Though the roller 44 is of a small diameter in comparison to the wheel 38, the extensive width of the roller 44 provides a wide foot path which will not interfere with the blades of grass to be cut in that it is completely within the cutting swath 27. The mounting of the roller 44 permits it to lie underneath the cutting blade 16 and disc 18 so as not to interfere with the normal cutting operation thereof. Also, this will permit the blade 16 to extend from both the front and opposite sides of the deck 30 to provide improved visibility of the cutting swath 27 at such locations. The ground support provided by the three point system of the front roller 44 and the two rear wheels 38 is very stable in that it keeps the machine 10 in contact with the ground to a level cut corresponding to the cutting plane 29 over a wide range of ground conditions.

The disc 18 includes a hub 54 and a cover 56 which is secured to the shaft 28 by a nut 58 as shown in FIGS. 1 and 3. Removal of the nut 58 permits the cover 56 to be removed in order to replace the hub 54 upon which has been wound one or more of the cutting strips 16 with two strips 16 being shown in the present embodiment as is best seen in FIG. 4. The cover 56 may be suitably slotted as at 60 as shown in FIGS. 2, 3 and 4 to permit egress of the cutting strip 16 as will be more fully explained hereinafter.

The cutting blade 16 has a cutting portion 62 which is the free end thereof extending from the stored portion 64 wound about the hub 54 and from which it extends outwardly from the disc 18 a short predetermined length to terminate at the cutting circle 27. In the preferred embodiment a pair of cutting blades 16 are used which are double wound upon the hub 54 to individually exit from diametrically formed slots 60. Since the pair of cutting blades 16 and associated disc 18 components such as slots 60 are the same each will be given the same reference character, but reference to either one will equal reference to the pair. As the cutting portion 62 of the blade 16 exits through slot 60 it is twisted as shown in FIGS. 2, 4, 6 and 7 so that the leading edge 66 is closest to the ground and the width is sloped rearwardly and upwardly to the trailing edge 68 at a predetermined angle set by the width of the blade 16 and the height of the slot 60. The twisted blade 16, as it rotates, produces a vortex or fan effect as shown in FIG. 2 urges the blades of grass to be more vertical for cutting thereof, thus the vortex effect aids in cutting and will also aid in removal of the cuttings.

FIGS. 3, 4 and 5 illustrate the arrangement of the cutting assembly 70 and includes the disc 18. The drive member 28 has a flange 72 formed inwardly of its reduced diameter threaded end 74. The disc 18 of the cutting assembly 70 is affixed to the drive member 28 between the flange 72 and a washer 76 by plastic nut 78 threadedly secured to the end 74. Also a "D" flat 80 is formed on the section of the drive member 28 between the flange 72 and the end 74 to engage a complementary surface of a central aperture 82 of the cover member 56 of the disc 18, thereby preventing relative rotation between the disc 18 of the cutting assembly 70 and drive member 28.

FIGS. 3, 4 and 5 also show the relationship of the cutting assembly 70, which includes the disc 18 and the components thereof including, a hub 54 containing the double-wrapped stored portion 64 of the resilient cutting blade 16, and indexing means 84. The top 86 of the hub 54 is flush with the disc's cover member 56 upper surface 88 as best seen in FIG. 6. A sliding clearance exists between the hub's lower surface 90 and the cover member 56. This aids in the operator releasing a predetermined length of the cutting portion 62 of the blade 16 and permits rotation of the hub 54 relative to the cover member 56. The indexing means 84 is connected to member 56 to normally prevent the hub 54 from relative rotation. The indexing means 84 shown in FIGS. 3 and 5 includes a curved spring flap 92 mounted within a lower recessed portion 94 and affixed therein by fasteners 96. A conical projection 98 is connected to the flap's free end and passes through an opening 100 in the cover member 56 to be engaged into one of a plurality of indexing openings 102 in the hub 54. A finger indentation 104 is formed in the recessed portion 94 as shown in FIG. 3, to assist the operator in grasping the indexing means 84 to release the same. The lower recessed portion 94 shelters the connecting means 58 and the indexing means 84.

The cutting blade 16 is constructed of super-tough fast-molding nylon thermoplastic having low notch sensitivity, one such material is sold by DUPONT under the trademark "ZYTEL" ST. The tape is approximately one millimeter thick and eight millimeters wide.

With particular attention to FIGS. 4 and 6, a periphery or circular exterior wall 106 and the circular interior wall 108 enclose an open-topped perimeter cavity 110 in the cover member 56 of the disc 18. This construction conserves material, thereby reducing weight and energy consumption. The base 112 of the disc 18 turns vertically upwardly to terminate at the periphery 106 thereof.

A guide chamber 114 is in communication with the slot 60. The guide chamber 114 is separated from the open chamber 110 by a radial wall 116 and a tangential wall 118. An opening 120 is formed at the base of chamber 114 adjacent the location from which the walls 116 and 118 diverge. The cutting portion 62 exits the hub 54 through the opening 120, the chamber 114 and the slot 60.

Referring to FIGS. 6 and 7, it will be seen that the height of the slot 60 being shorter than the width of the blade 62 acts to orientate the leading edge 66 of the cutting portion 62 of the blade 16 at an angle of attack with respect to the ground surface 18, preferrably within the range of 5° to 15° to provide a suitable vortex effect.

The arrow 122 shown in FIG. 4 indicates that the direction of rotation when viewing the machine 10 downwardly from a top plan view will be counterclockwise, and that the chamber 114 is formed behind the external cutting portion 62 of the blade 16. The cutting portion 62 is of predetermined length and will be set by manual or automatic cut off means (not shown) used by the operator or mounted in the housing 12 on the underside of the deck 30 thereof. The length of the slot is greater than the external length of the cutting portion 62. The blade 16 is flexible so that whenever a heavy obstacle is encountered the resulting impact with the blade 16 will cause the cutting portion 62 to be deflected as shown in phantom on the right side of FIG. 4 within the chamber 114 and slot 60. This will result in only the smooth circular periphery 106 of the disc 18 engaging such obstacle until the machine is either moved or shut-off.

The blade 16 will be supplied by the operator mounting a loaded hub 54 upon the cover member 56 and pulling a strip thereof through the opening 120, the chamber 114 and exiting the slot 60. This is done with the indexing means out of engagement with the openings 102 of the hub 54. Thereafter the conical projection 98 of the indexing means 84 will be snapped into one of the openings 102. Subsequently, the operator can insert the disc 18 upon the drive member 28 and secure the assembly by connecting the washer 76 and nut 78 to the end 74 of the member 28.

In operation, the cutting blade 16 rotates in the cutting circle 27 and is suitably twisted to create a "fan or vortex effect" so as to draw the blades of the grass into a vertical position for better cutting and removal thereof. Whenever a heavy obstacle is impacted by the cutting portion 62 of the blade 16 it will cause the cutting portion 62 to be deflected into the slot 60 and chamber 114. Otherwise during operation of the machine 10 the cutting portion 62 of the blade 16 will cut the grass along the cutting plane 29. Upon the cutting portion 62 becoming worn or frayed a new supply will be withdrawn from the storage portion 64 of the blade 16 and the old portion will be cut away. This process will be repeated until a fresh hub 54 having a new supply of the flexible blade 16 is required.

It will be understood that various changes in the details, materials, arrangements of parts and operating conditions which have been herein described and illustrated in order to explain the nature of the invention may be made by those skilled in the art within the principles and scope of the invention.

I claim:

1. A grass cutting mechanism having a drive shaft journaled in a housing and driven by rotary power means mounted in the housing, the cutting mechanism comprising:
   (a) a disc means detachably affixed at the lower end of the drive shaft and to rotate therewith in a predetermined direction,
   (b) the disc means having an inner chamber and an outer chamber communicating with each other through an intermediate aperture,
   (c) the aperture having a pair of spaced walls defining a fulcrum, with one of the walls being a downstream wall extending radially outwardly at an inclined angle with the leading edge thereof in the direction of rotation, and the other of the walls being an upstream wall turned substantially tangentially from the aperture to extend perpendicular to and away from the downstream wall for a distance substantially twice the length of the downstream wall whereby the outer chamber is formed therebetween,
   (d) a cutting blade is mounted in the inner chamber of the disc means and is threaded through the aperture to extend along the downstream wall in an inclined position, outwardly of the outer chamber a predetermined distance, which distance is greater than the length of the inclined downstream wall and less than the length of the upstream wall,
   (e) the cutting blade is made of flexible plastic having a predetermined stiffness, and having a width of between five to ten times greater than its thickness, and upon striking a heavy object the cutting blade is wholly deflected into the outer chamber of the disc,
   (f) the cutting blade having a leading edge which follows the incline of the leading edge of the downstream wall to provide a cutting edge at the thin surface of the leading edge thereof and to provide a fan effect at the wide surface thereof to lift the grass being cut.

2. The combination claimed in claim 1, wherein:
   (a) the downstream wall extending radially from the aperture to the periphery of the outer chamber,
   (b) the upstream wall extending tangentially from the aperture to the periphery of the outer chamber,
   (c) a slot formed in the periphery of the outer chamber to extend from the downstream wall to the upstream wall,
   (d) the cutting blade normally extending from the slot at the downstream wall and adapted on contacting a relatively heavy object to be deflected upon the upstream wall of the aperture in fulcrum fashion to be shifted along the slot and into the outer chamber.

3. The combination claimed in claim 2, wherein:
   (a) the cutting blade having a length measured outwardly from the aperture which is shorter then the length of the slot to permit total immersion of the cutting blade through the slot within the outer chamber upon impact with a heavy object.

4. A grass cutting mechanism having a drive shaft journaled in a housing and driven by rotary power means mounted in the housing, the cutting mechanism comprising:
   (a) a disc means detachably affixed at the lower end of the drive shaft and to rotate therewith in a predetermined direction,
   (b) the disc means having an inner chamber and an outer chamber communicating with each other through an intermediate aperture,
   (c) the aperture is a substantially narrow opening with a vertical dimension at least five times greater than the horizontal dimension,
   (d) the aperture having a pair of spaced walls defining a fulcrum, with one of the walls being a downstream wall extending radially outwardly at an inclined angle with the leading edge thereof in the direction of rotation, and other of the walls being an upstream wall turned substantially tangentially from the aperture to extend perpendicular to and away from the downstream wall for a distance substantially twice the length of the downstream wall whereby the outer chamber is formed therebetween, (e) a cutting blade is mounted in the inner chamber of the disc means and is threaded through the aperture to extend along the downstream wall in an inclined position, outwardly of the outer chamber a predetermined distance, which distance is greater than the length of the inclined downstream wall and less than the length of the upstream wall, (f) the cutting blade is made of flexible plastic having a predetermined stiffness, and having a width of between five to ten times greater than its thickness, and upon striking a heavy object the cutting blade is wholly deflected into the outer chamber of the disc, (g) the cutting blade having a leading edge which follows the incline of the leading edge of the downstream wall to provide a cutting edge at the thin surface of the leading edge thereof and to provide a fan effect at the wide surface thereof to lift the grass being cut, (h) the cutting blade exits the aperture with its wide surface substantially vertical and subsequently normally extends in an inclined position along the downstream wall, (i) the cutting blade will bend at the aperture against the upstream wall thereof to be deflected into the outer chamber upon the cutting blade impacting a heavy object during the grass cutting operations of the mechanism.

* * * * *